(12) United States Patent
Nishina et al.

(10) Patent No.: US 9,280,274 B2
(45) Date of Patent: Mar. 8, 2016

(54) INFORMATION PROCESSING DEVICE, DISPLAY CONTROL METHOD, PROGRAM AND INFORMATION STORAGE MEDIUM

(75) Inventors: Eiichi Nishina, Tokyo (JP); Keigo Tsuchiya, Tokyo (JP); Hisao Wada, Tokyo (JP)

(73) Assignees: Sony Corporation, Tokyo (JP); Sony Computer Entertainment Inc., Tokyo (JP)

(*) Notice: Subject to any disclaimer, the term of this patent is extended or adjusted under 35 U.S.C. 154(b) by 340 days.

(21) Appl. No.: 13/609,384

(22) Filed: Sep. 11, 2012

(65) Prior Publication Data

US 2013/0067395 A1 Mar. 14, 2013

(30) Foreign Application Priority Data

Sep. 13, 2011 (JP) ................................ 2011-200045

(51) Int. Cl.
G06F 3/048 (2013.01)
G06F 3/00 (2006.01)
G06F 3/0488 (2013.01)
G06F 3/0485 (2013.01)
G09G 5/34 (2006.01)

(52) U.S. Cl.
CPC ............ *G06F 3/0488* (2013.01); *G06F 3/0485* (2013.01); *G09G 5/34* (2013.01); *G09G 2354/00* (2013.01)

(58) Field of Classification Search
CPC ..... G06F 3/048; G06F 3/0482; G06F 3/0485; G06F 3/00
USPC .................................. 715/830, 784; 345/684
See application file for complete search history.

(56) References Cited

U.S. PATENT DOCUMENTS

| | | | |
|---|---|---|---|
| 7,469,381 B2 | 12/2008 | Ording | |
| 7,903,115 B2* | 3/2011 | Platzer et al. ................. | 345/473 |
| 7,958,456 B2 | 6/2011 | Ording | |
| 2007/0132789 A1* | 6/2007 | Ording et al. ................. | 345/684 |

(Continued)

FOREIGN PATENT DOCUMENTS

| | | |
|---|---|---|
| JP | 2009521754 A | 6/2009 |
| JP | 2010515978 A | 5/2010 |
| JP | 2011517810 A | 6/2011 |

OTHER PUBLICATIONS

International Search Report and Partial translation of Written Opinion fro corresponding PCT Application No. PCT/JP2012/073187, dated Dec. 18, 2012.

(Continued)

*Primary Examiner* — Jennifer To
*Assistant Examiner* — Jasmine Wan
(74) *Attorney, Agent, or Firm* — Matthew B. Dernier, Esq.

(57) ABSTRACT

An information processing device for allowing a user to immediately understand that a beginning or end element object is displayed on a screen is provided. The device includes a display unit for displaying a portion of a display object, in which a plurality of element objects are arranged, in a display area, a first scrolling unit for scrolling the display object in a first direction in response to an operation of a user, a second scrolling unit for scrolling the display object in a second direction that is opposite to the first direction, and a determination unit for determining whether or not to scroll the display object in the second direction based on a position of the display area and a position corresponding to the plurality of element objects.

20 Claims, 8 Drawing Sheets

(56) References Cited

U.S. PATENT DOCUMENTS

| | | |
|---|---|---|
| 2007/0150830 A1 | 6/2007 | Ording |
| 2008/0168404 A1 | 7/2008 | Ording |
| 2009/0070711 A1* | 3/2009 | Kwak et al. ............... 715/829 |
| 2009/0231271 A1* | 9/2009 | Heubel ............... G06F 3/016 345/156 |
| 2010/0058240 A1* | 3/2010 | Bull et al. ............... 715/830 |
| 2010/0325575 A1* | 12/2010 | Platzer et al. ............... 715/781 |
| 2011/0010659 A1* | 1/2011 | Kim ............... G06F 3/0485 715/784 |
| 2011/0107264 A1* | 5/2011 | Akella ............... 715/830 |
| 2011/0252362 A1* | 10/2011 | Cho et al. ............... 715/784 |
| 2012/0272181 A1* | 10/2012 | Rogers et al. ............... 715/784 |
| 2012/0278755 A1* | 11/2012 | Lehmann et al. ............... 715/784 |
| 2014/0108997 A1* | 4/2014 | Beaver et al. ............... 715/784 |

OTHER PUBLICATIONS

International Preliminary Report on Patentability and Written Opinion fro corresponding PCT Application No. PCT/JP2012/073187, dated Mar. 27, 2014.

Office Action for corresponding JP Application No. 2013533671, dated Jun. 2, 2015.

Search Report for corresponding EP Application no. 12831212.1-1972, dated May 19, 2015.

* cited by examiner

INFORMATION PROCESSING DEVICE, DISPLAY CONTROL METHOD, PROGRAM AND INFORMATION STORAGE MEDIUM

TECHNICAL FIELD

The present invention relates to an information processing device, a display control method, a program, and an information storage medium, and in particular, to improvement of user interface for displaying a plurality of element objects.

BACKGROUND ART

When a large number of element objects including search results, news article subjects, and file names in a storage device are displayed on a screen, it is often the case that such a user interface is employed that a display object (e.g., menu image), which has the element objects arranged on a background image according to predetermined criteria relating attributes, such as name or date, is prepared so that a portion of the display object is displayed on the screen and is moved in response to the scrolling operation. In a case where the screen is a touch screen, the scrolling operation includes drag and flick, for example. According to this user interface, a user can display any range of a display object, such as a menu image, on the screen by scrolling operation.

SUMMARY OF THE INVENTION

However, according to the user interface mentioned above, when the display object is scrolled to display a beginning or end element object, the user cannot immediately recognize whether or not the currently displayed element object is the beginning or end object. For example, when the display object is scrolled downward to display the beginning element object on the screen, the user will need to scroll further downward to find out that screen content is not changed in order to know the currently displayed element object is the beginning element object.

In this regard, when the downward scrolling operation is performed while the beginning element object is displayed on the screen, it may be possible to display a background image above the beginning element object while further moving the beginning element object down to the lower screen. In this way, the user will intuitively understand that there is no other element object placed above the beginning element object. However, the above mentioned manner requires a large background image and results in increasing the size of the memory.

One or more embodiments of the present invention have been conceived in view of the above, and one or more objects of the embodiments is to provide an information processing device, a display control method, a program, and an information storage medium for allowing a user to immediately understand that a beginning or end element object is displayed on a screen without increasing the size of the memory.

In order to solve the above described problems, an information processing device according to the present invention includes a display unit configured to display a portion of a display object, in which a plurality of element objects are arranged, in a display area, a first scrolling unit configured to scroll the display object in a first direction in response to an operation by a user, a second scrolling unit configured to scroll the display object in a second direction that is opposite to the first direction, and a determination unit configured to determine whether or not to scroll the display object in the second direction based on a position of the display area and a position corresponding to the plurality of element objects.

Further, a display control method according to the present invention includes the steps of displaying a portion of a display object, in which a plurality of element object are arranged, on a display area, scrolling the display object in a first direction in response to an operation by a user, scrolling the display object in a second direction that is opposite to the first direction, and determining whether or not to scroll the display object in the second direction based on a position of the display area and a position corresponding to the plurality of element objects.

Further, a program according to the present invention causes a computer to function as a display unit configured to display a portion of a display object, in which a plurality of element objects are arranged, in a display area, a first scrolling unit configured to scroll the display object in a first direction in response to an operation of a user, a second scrolling unit configured to scroll the display object in a second direction that is opposite to the first direction, and a determination unit configured to determine whether or not to scroll the display object in the second direction based on a position of the display area and a position corresponding to the plurality of element objects. The program may be stored in a computer-readable information storage medium, such as a CD-ROM, DVD-ROM, and memory.

The determination unit may determine whether or not to scroll the display object in the second direction based on a distance between the position placed in the display area and a position of an element object that is an end of the plurality of element objects.

The determination unit may determine whether or not to scroll the display object in the second direction based on a result of comparing a position placed in the display area with a position representing the plurality of element objects.

The determination unit determines whether or not to scroll the display object in the second direction based on whether or not a position of an element that is an end of the plurality of element objects is placed in a range in the display area.

The second scrolling unit may scroll the display object in the second direction so as to return the element object that is the end of the plurality of element objects to a reference position, which is placed on the side of the second direction in the range. The second scrolling unit also may scroll the display object in the second direction so as to return the element object that is the end of the plurality of element objects to the reference position, in a case where a predetermined time has passed while the position of the element object that is the end of the plurality of element objects remains in a position closer to the second direction than the range.

The first scrolling unit may not be operated by the user while the second scrolling unit scrolls the display object in the second direction.

DETAILED DESCRIPTION OF THE INVENTION

An embodiment of the present invention will be described below in detail with reference to the accompanying drawings.

Figure 1:
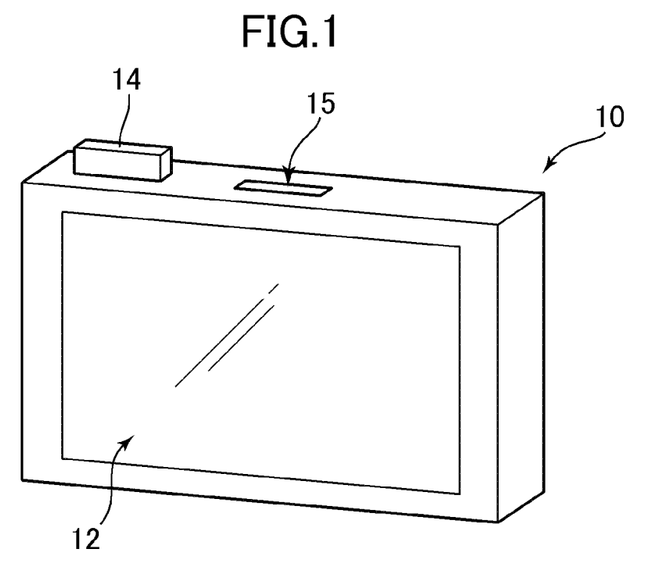
FIG. 1 is an external perspective view of a portable information processing device according to an embodiment of the present invention.
Figure 2:
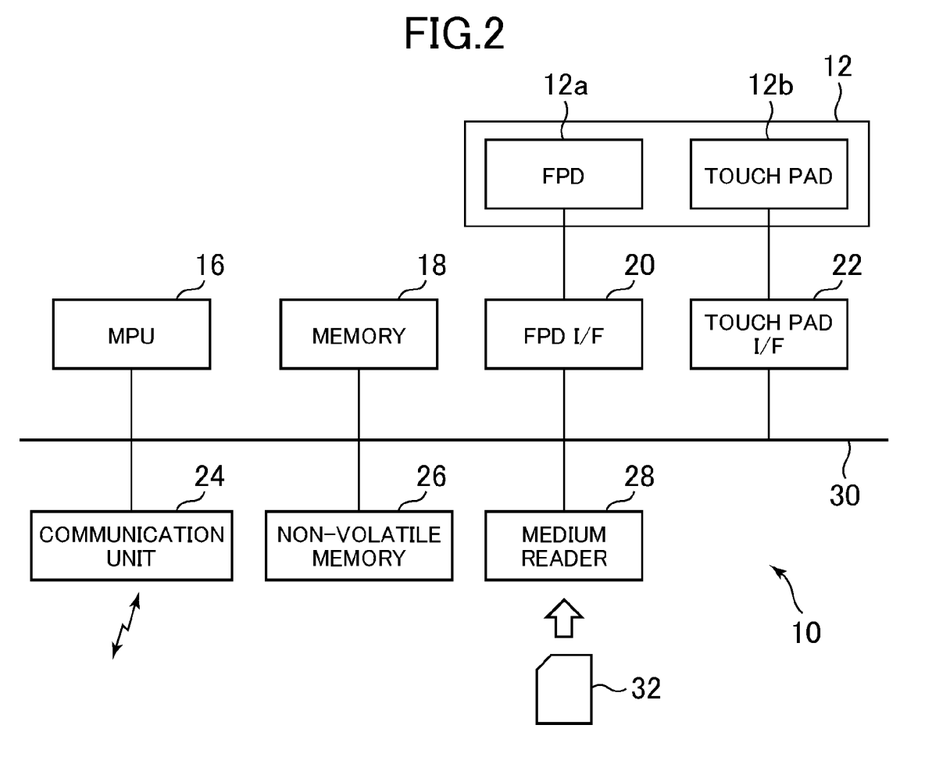
FIG. 2 is a diagram showing a hardware structure of the portable information processing device according to an embodiment of the present invention.

FIG. 1 is an external perspective view of a portable information processing device according to an embodiment of the present invention. FIG. 2 is a diagram showing a hardware structure of the portable information processing device. The portable information processing device 10 shown in FIGS. 1 and 2 is an embodiment of a menu display device according to the present invention, and a control method thereof is an embodiment of a menu display control method according to the present invention. Further, a program executed in the portable information processing device 10 is an embodiment of the program according to the present invention. As shown in FIG. 1, the portable information processing device 10 is a thin, box-shaped computer system. The front surface of the portable information processing device 10 is almost covered with a touch surface of a touch panel 12, and a power button 14 and a memory card slot 15 are provided on the side surface. The portable information processing device 10 is driven by a rechargeable internal battery (not shown).

As shown in FIG. 2, the portable information processing device includes a MPU 16 connected to a bus 30 for mutual data transmission, a memory 18, a FPD interface 20, a touch pad interface 22, communication unit 24, a non-volatile memory 26, and a medium reader 28. As mentioned above, the portable information processing device 10 includes the touch panel 12. The touch panel 12 includes a FPD (Flat Panel Display) 12a with liquid crystal or organic EL (Electro-Luminescence) and a capacitive or other type of touch pad 12b. The FPD interface 20 is connected to the FPD 12a, and the touch pad interface 22 is connected to the touch pad 12b. The memory 18 is used as a workspace of the MPU 16. The FPD interface 20 includes a memory for storing images to be displayed on the FPD 12a, periodically outputs the images stored in the memory to the FPD 12a, and updates the images displayed by the FPD 12a. The touch pad interface 22 periodically calculates a touched position based on a signal from the touch pad 12b and supplies the touched position to the MPU 16. The communication unit 24 connects to a data communication network, such as the Internet, to serve as a function to transmit or receive data. The non-volatile memory 26 is storage means larger than the memory 18, and stores an operating system and various application programs. The medium reader 28 reads out data from a computer-readable information storage medium such as a memory card 32, and writes data in such computer-readable information storage medium.

The portable information processing device 10 executes a program to display a display object (hereinafter referred to as a menu image as a specific example) that is scrollable by user's operation. The program may be a portion of the operating system, or an application program such as an image viewer for displaying a large number of images, or a search program for displaying a large number of search results. Further, the program may be stored in the non-volatile memory 26 in advance, or downloaded by the communication unit 24 before being stored in the non-volatile memory 26. Further, the program may be copied from the memory card 32 to the non-volatile memory 26. Alternatively, the program stored in the memory card 32 may be executed directly by the MPU 16.

Figure 7:
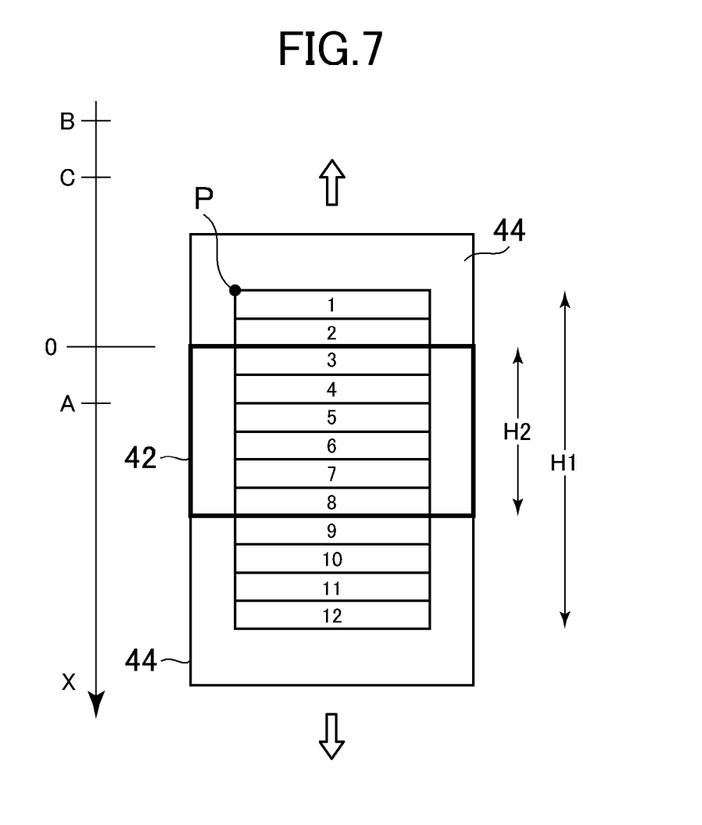
FIG. 7 is a diagram conceptually illustrating the menu scrolling.
Figure 8:
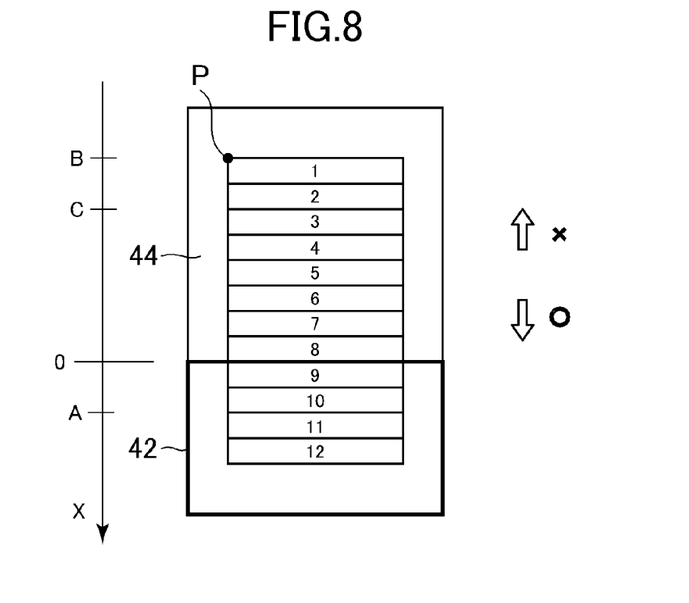
FIG. 8 is a diagram conceptually illustrating the menu scrolling.
Figure 9:
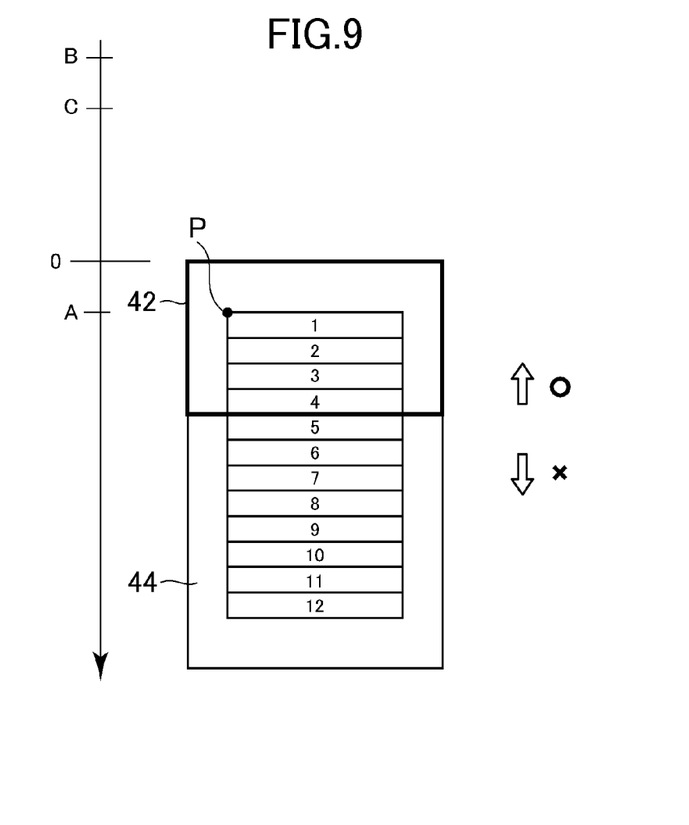
FIG. 9 is a diagram conceptually illustrating the menu scrolling.

FIGS. 3 through 6 show a menu image displayed on the touch panel 12 while being scrolled. FIGS. 7 through 9 show a relationship between the menu image and the display range of the menu image. As shown in FIG. 7, in this embodiment, the menu image displayed on the touch panel 12 includes, for example, strip-shaped menu item images (element objects) 1-12 extending horizontally. The menu item images 1-12 are placed on the background image 44. The menu item images 1-12 may indicate, for example, email subjects arranged in order of receipt date, titles of music data arranged in order of acquisition, or thumbnails of image data arranged in order of captured time. These twelve menu item images 1-12 are virtually placed in this order on the background image 44 one above the other without space between them. That is, the menu item image 1 is placed on the top of the menu image, and the menu item image 12 is placed on the bottom. On the left and right of the menu item images 1-12, the background image 44 is exposed. The background image 44 is also exposed in about a width W above the menu item image 1 and below the menu item image 12, respectively.

Further, the menu image is placed in a manner to penetrate a range displayed on the touch panel 12, i.e., a display range 42. In response to the user's scrolling operation, the menu image virtually moves up or down relative to the display range 42 (see FIG. 7). In this way, any group of menu item images is placed in the display range 42, and those menu item images are displayed on the touch panel 12. In this regard, however, moving range of the menu image is restricted. That is, the menu image can be moved downward until the coordinate P, which is on the top corner of the menu item image 1, comes to the coordinate A to make the width W (see FIG. 5) between the menu item image 1 and the upper edge of the screen, but further movement of the menu image is restricted (see FIG. 9). In addition, the menu image can be moved upward until the coordinate P comes to the coordinate B to make the width W between the menu item image 12 and the lower edge of the screen, but further movement of the menu image is restricted (see FIG. 8). In this regard, when the coordinate P equals zero, there is no space between the menu item image 1 and the upper edge of the screen, and when the coordinate P equals C, there is no space between the menu item image 12 and the lower edge of the screen. When the height of the menu image is H1, and the height of display range 42 is H2, the relationship is represented by the following equations: $A=W$, $B=-H1+H2-W$, $C=-H1+H2$, where W may be set to equal to or less than ½ of H2, e.g., ⅓ of H2.

Figure 3:
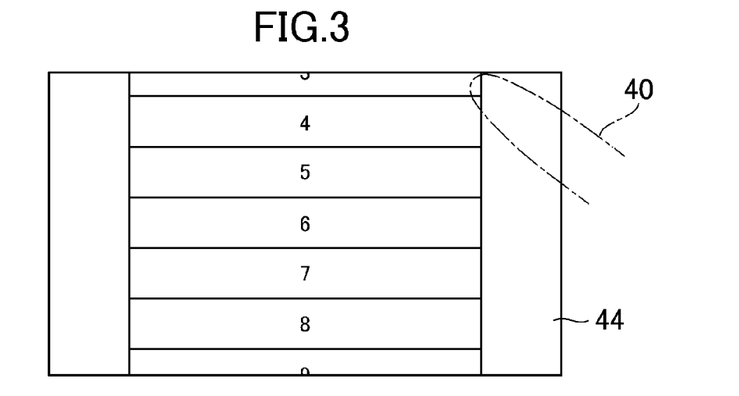
FIG. 3 is a diagram showing a screen displaying a menu being scrolled.
Figure 4:
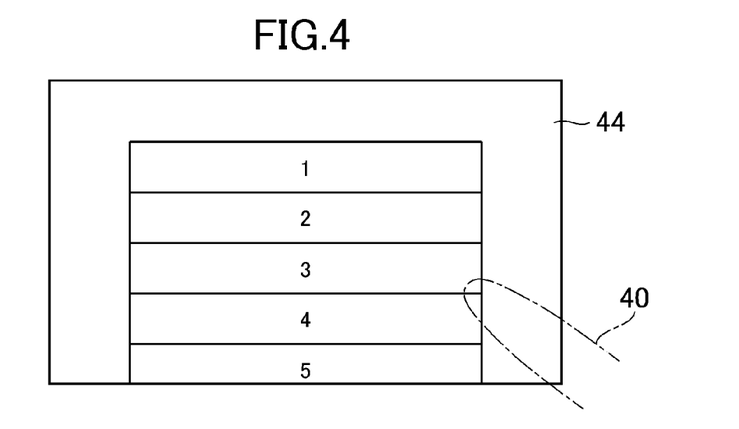
FIG. 4 is a diagram showing a screen displaying a menu being scrolled.
Figure 5:
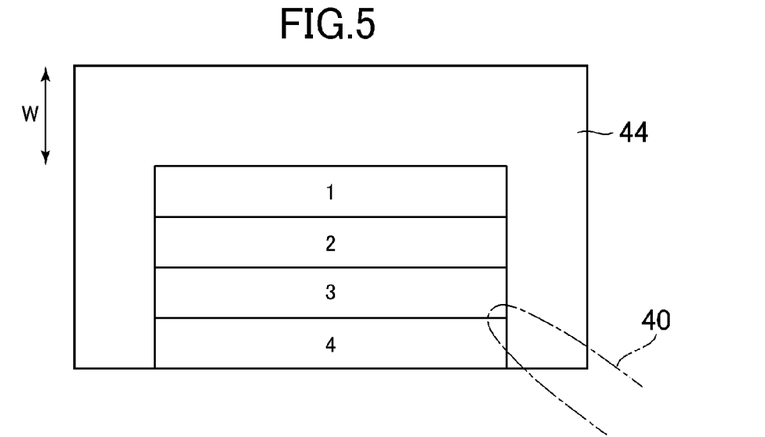
FIG. 5 is a diagram showing a screen displaying a menu being scrolled.
Figure 6:
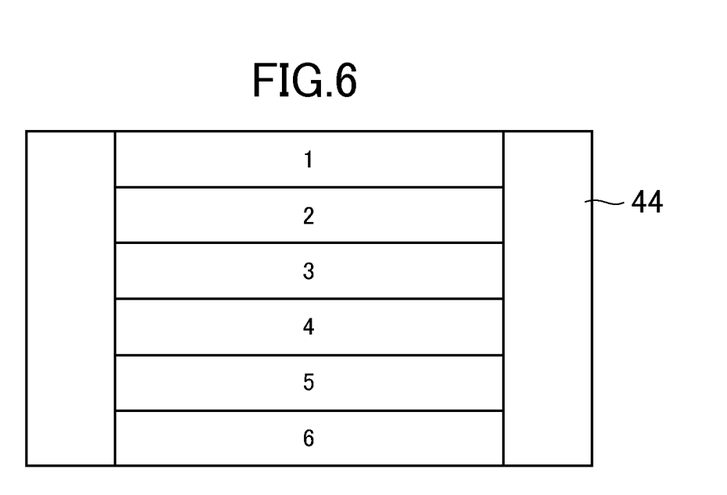
FIG. 6 is a diagram showing a screen displaying a menu being scrolled.

The specific operation will be discussed below. As shown in FIG. 3, while the menu item images 4-8 and portions of respective menu item images 3 and 9 are displayed on the touch panel 12, when the user slides (drags) their finger 40 downward while keeping their finger 40 touched on the touch screen, the menu image moves downward relative to the display range 42 according to the amount of sliding. In this way, the menu item images 1 and 2 will also be newly displayed on the touch panel 12. FIG. 4 shows an example of the screen when the finger 40 slides downward after the state shown in FIG. 3. In the screen shown in FIG. 4, the menu item images 1-4 and a portion of the menu item image 5 are displayed.

In this embodiment, as mentioned above, the distance between the menu item image 1 and the upper edge of the screen is restricted within the width W. When the finger 40 further slides downward from the state of FIG. 4 so as to make the distance between the menu item image 1 and the upper edge of the screen greater, the menu image is forcibly scrolled upward (opposite direction) irrespective of the operation performed on the touch pad 12b. Then, the display of the touch panel 12 returns to the state shown in FIG. 6. That is, the menu item image 1 returns to the position where its top portion contacts the upper edge of the screen. In this way, the menu item images 1-6 will be displayed on the screen. Here, while the menu image is forcibly scrolled to the opposite direction, the touch operation of the user is not accepted. That is, even though the user performs downward sliding operation on the touch pad 12b, such operation will be ignored. By restricting the distance between the menu item image 1 and the upper edge of the screen to the width W as mentioned above, it is possible not to expose a large portion of the background image 44 above the menu item image 1. Similarly, in this embodiment, the distance between the menu item image 12 and the lower edge of the screen is restricted within the width W. When upward sliding operation is performed so as to make the distance between the menu item image 12 and the lower edge of the screen greater, the menu image is forcibly scrolled downward (opposite direction) irrespective of the operation performed on the touch pad 12b. Then, the menu item image 12 returns to the position where its lower edge contacts the lower edge of the screen. In this way, it is possible not to expose a large portion of the background image 44 above and below the menu item images 1-12 and thereby reducing the size of the background image 44.

Further, in this embodiment, as shown in FIG. 4, in a case where the distance between the menu item image 1 and the upper edge of the screen remains less than the width W and the predetermined time (e.g., 10 seconds) has passed, the menu image is also forcibly scrolled upward irrespective of the operation performed on the touch pad 12b. Then, the menu item image 1 returns to the position where its top portion contacts the upper edge of the screen (see FIG. 6). Similarly, in a case where the distance between the menu item image 12 and the lower edge of the screen remains less than the width W and the predetermined time has passed, the menu image is also forcibly scrolled downward irrespective of the operation performed on the touch pad 12b. Then, the menu item image 12 returns to the position where its lower edge contacts the lower edge of the screen. In this way, it is possible to prevent the top and bottom of the background image 44 from being displayed for a long time.

Figure 10:
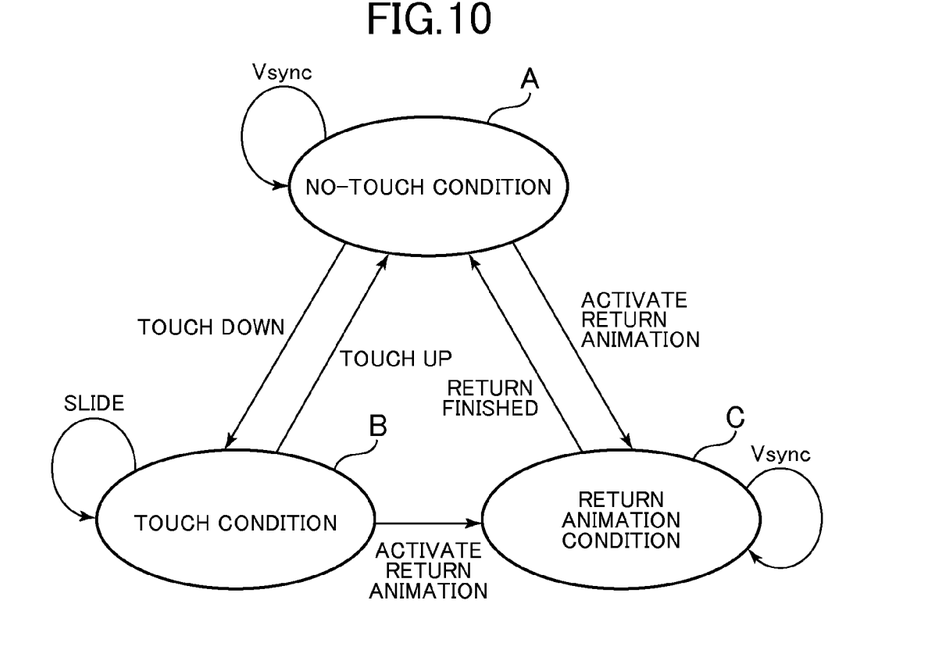
FIG. 10 is a control transition diagram illustrating the portable information processing device according to an embodiment of the present invention.

In the following, processing of the portable information processing device 10 to implement the user interface mentioned above will be discussed in detail. FIG. 10 is a control transition diagram illustrating the menu display. As shown in FIG. 10, control conditions include three conditions: no-touch condition A, touch condition B, and return animation condition C. The no-touch condition A is a condition where the touch panel 12 is not touched and a return animation (indicating an opposite direction scrolling of the menu image as mentioned above) is not replayed. When the program according to this embodiment is activated, the control condition is also in the no-touch condition A. The touch condition B is a condition where the touch panel 12 is touched and the return animation is not replayed. The return animation condition C is a condition shifted when the replay condition of the return animation is satisfied, and remains until replay of the return animation ends. When a touch-down event (i.e., touching the touch panel 12 first from the no-touch condition) occurs, the condition shifts from the no-touch condition A to the touch condition B. Further, the condition shifts from the touch condition B to the no-touch condition A by touch-up event (i.e., lifting the finger from the touch panel 12). When the replay condition of the return animation is satisfied, the condition shifts from the touch condition B to the return animation condition C. Similarly, when the replay condition of the return animation is satisfied, the condition shifts from the no-touch condition A to the return animation condition C. Further, when the replay of the return animation is finished in the return animation condition C, the condition shifts to the no-touch condition A. In the return animation condition C, the touch event is ignored, and the condition does not shift to other conditions in response to the user's touch operation.

Figure 11:
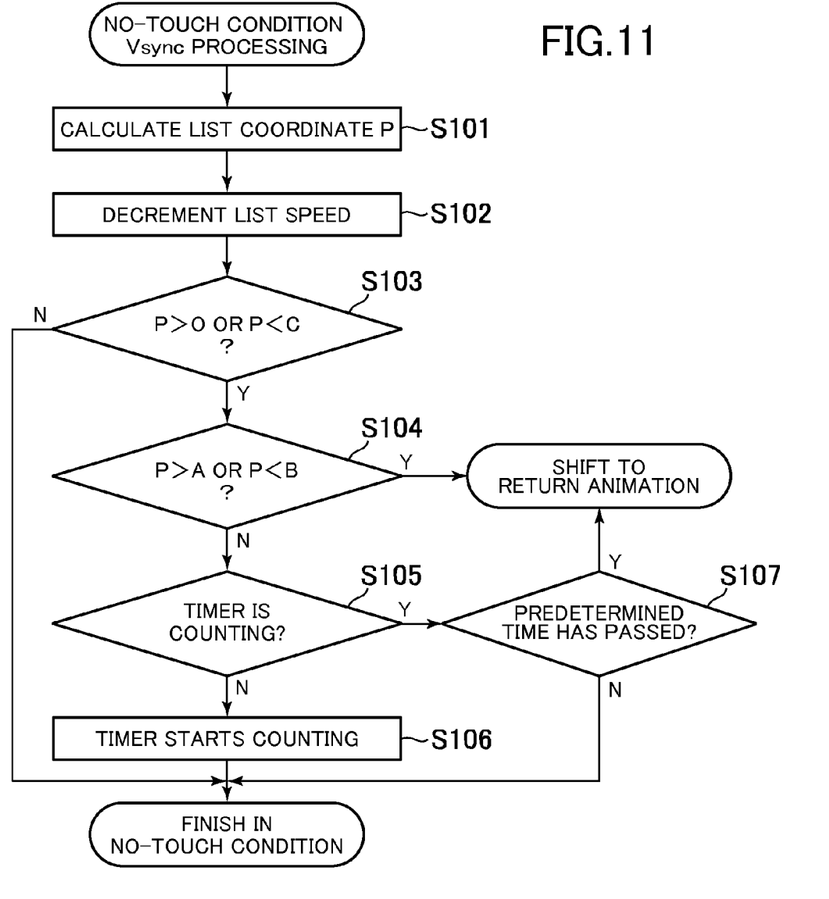
FIG. 11 is a flow chart illustrating information processing when a Vsync event occurs in a no-touch condition.

FIG. 11 is a flow chart illustrating processing to be executed when a Vsync event occurs in the no-touch condition. Vsync (video synchronization signal) is a signal generated when the display content of the touch panel 12 is updated. Whenever this signal is generated, a coordinate (list coordinate) P of the menu image is calculated (S101). The coordinate P indicates the position of the top corner of the menu item image 1. By adding movement velocity (list speed) V of the current menu image to the current coordinate P, the updated coordinate P is calculated. Initial values of the coordinate P and the movement velocity V are both 0. Then, the menu image is displayed on the touch panel 12 using the updated coordinate P. That is, a portion within the display range 42 on the menu image, i.e., a portion having the coordinate value that is equal to or greater than 0 and equal to or less than H2 is depicted to be displayed on the touch panel 12.

Subsequently, a predetermined value is subtracted from the movement velocity V so as to bring the movement velocity V close to 0 (S102). In a case where the sign of the subtracted movement velocity V is changed, the subtracted movement velocity V is set to 0. Then, it is determined whether or not the upper edge of the menu item image 1 is below the upper edge of the screen, or the lower edge of the menu item image 12 is above the lower edge of the screen (S103). More specifically, it is determined whether either of P>0 or P<C is true. If NO in S103, the processing is finished in the no-touch condition.

If YES in S103, it is determined whether or not the distance between the upper edge of the menu item image 1 and the upper edge of the screen exceeds the width W, or the distance between the lower edge of the menu item image 12 and the lower edge of the screen exceeds the width W (S104). More specifically, it is determined whether either of P>A or P<B is true. If YES in S104, the condition shifts to the return animation condition. In this regard, note that it is determined whether or not the condition shifts to the return animation condition depending on the result of comparing the positions A or B, which are placed in the screen (display area), with the position P, which is a position representing the menu item images 1-12.

The position that represents menu item images 1-12 can be placed anywhere. The distance between the position of the upper or lower edge of the screen (display area) and the position of the beginning or end element object, i.e., the menu item image 1 or 12, may be calculated, and when the distance exceeds the width W, the condition may shift to the return animation condition. When the height of the menu item images 1-12 is h, the condition may shift to the return animation condition depending on whether or not the menu item image 1 enters in the range of X>W+h, or, whether or not the menu item image 12 enters the range of X<H2−W−h. Here, X indicates a coordinate value in the scrolling direction. In this case, the condition may shift to the return animation condition when the position of the lower edge of the menu item image 1 is smaller than W+h. Similarly, the condition may shift to the return animation condition when the position of the lower edge of the menu item image 12 is greater than H2−W−h.

If NO in S104, it is determined whether or not a timer is running (S105). If the timer is running, it is determined whether or not the time counted by the timer has passed the predetermined time (e.g., 10 seconds as mentioned above) (S107). If the time has passed the predetermined time, the condition shifts to the return animation condition. If NO in S105, the timer is activated to count time (S106), and the processing is finished in the no-touch condition.

Figure 12:
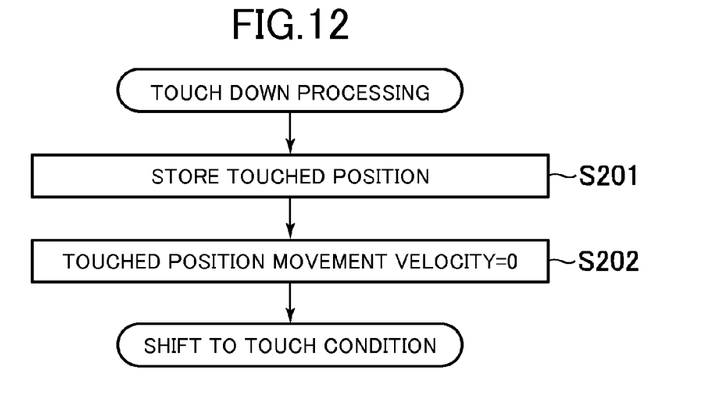
FIG. 12 is a flow chart illustrating information processing when a touch-down event occurs in a no-touch condition.

FIG. 12 is a flow chart showing processing executed when the touch down event occurs in the no-touch condition. The processing indicated in FIG. 12 is executed when the touch panel 12 is first touched from the state where it is not touched. In the processing, the touched position is stored (S201), the movement velocity of the touched position is initialized to 0 (S202), and then the condition shifts to the touch condition.

Figure 13:
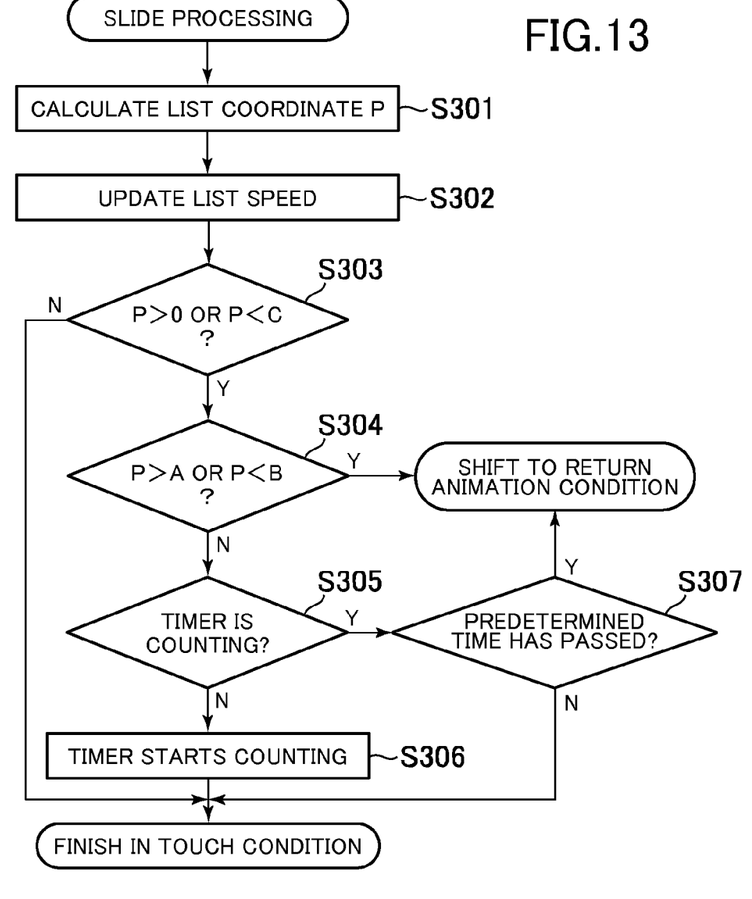
FIG. 13 is a flow chart illustrating information processing when a slide event occurs in a touch condition.

FIG. 13 is a flow chart showing processing executed when the slide event occurs in the touch condition. The processing indicated in FIG. 13 is executed when the touched position moves while the touch panel 12 is touched. It is determined whether or not the touched position moves while the touch panel 12 is touched, for example, at regular intervals. In the processing shown in FIG. 13, the coordinate P is calculated (S301). More specifically, a difference between the previous touched position and the current touched position is calculated, and the previous coordinate P is added to the difference so as to calculate the current coordinate P. Using the calculated coordinate P, the menu image is then displayed on the touch panel 12. Subsequently, the movement velocity V of the menu image is updated (S302). More specifically, a difference between the previous touched position and the current touched position is calculated, and then this difference is determined as the movement velocity V. However, if the absolute value of the movement velocity V exceeds the predetermined value, the movement velocity V is adjusted so that the absolute value is to be the predetermined value.

Subsequently, it is determined whether or not the upper edge of the menu item image 1 is below the upper edge of the screen, or the lower edge of the menu item image 12 is above the lower edge of the screen (S303). More specifically, it is determined whether either of P>0 or P<C is true. If NO in S303, the processing is finished in the touch condition.

If YES in S303, it is determined whether or not the distance between the upper edge of the menu item image 1 and the upper edge of the screen exceeds the width W, or the distance between the lower edge of the menu item image 12 and the lower edge of the screen exceeds the width W (S304). More specifically, it is determined whether either of P>A or P<B is true. If YES in S304, the condition shifts to the return animation condition. In this case, similarly to the processing in S104 mentioned above, it may be determined whether or not the condition shifts to the return animation condition using various other ways.

If NO in S304, it is determined whether or not the timer is running (S305). If the timer is running, it is determined whether or not the time counted by the timer has passed the predetermined time (e.g., 10 seconds as mentioned above) (S307). If the time has passed the predetermined time, the condition shifts to the return animation condition. If NO in S305, the timer is activated to count time (S306), and the processing is finished in the touch condition.

Figure 14:
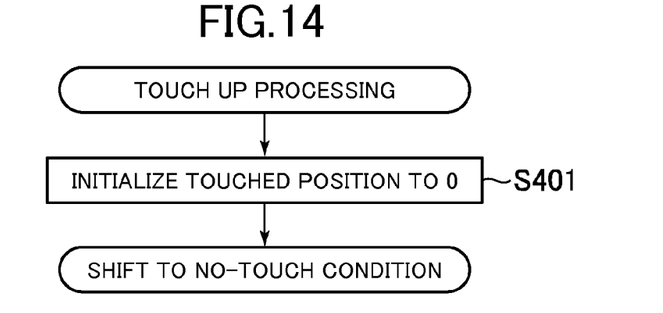
FIG. 14 is a flow chart illustrating information processing when a touch-up event occurs in a touch condition.

FIG. 14 is a flow chart showing processing executed when the touch-up event occurs in the touch condition. In the touch condition, the processing starts when the touch panel 12 comes to be not touched. In the processing, the touched position is initialized to 0 (S401), and then the condition shifts to the no-touch condition.

Figure 15:
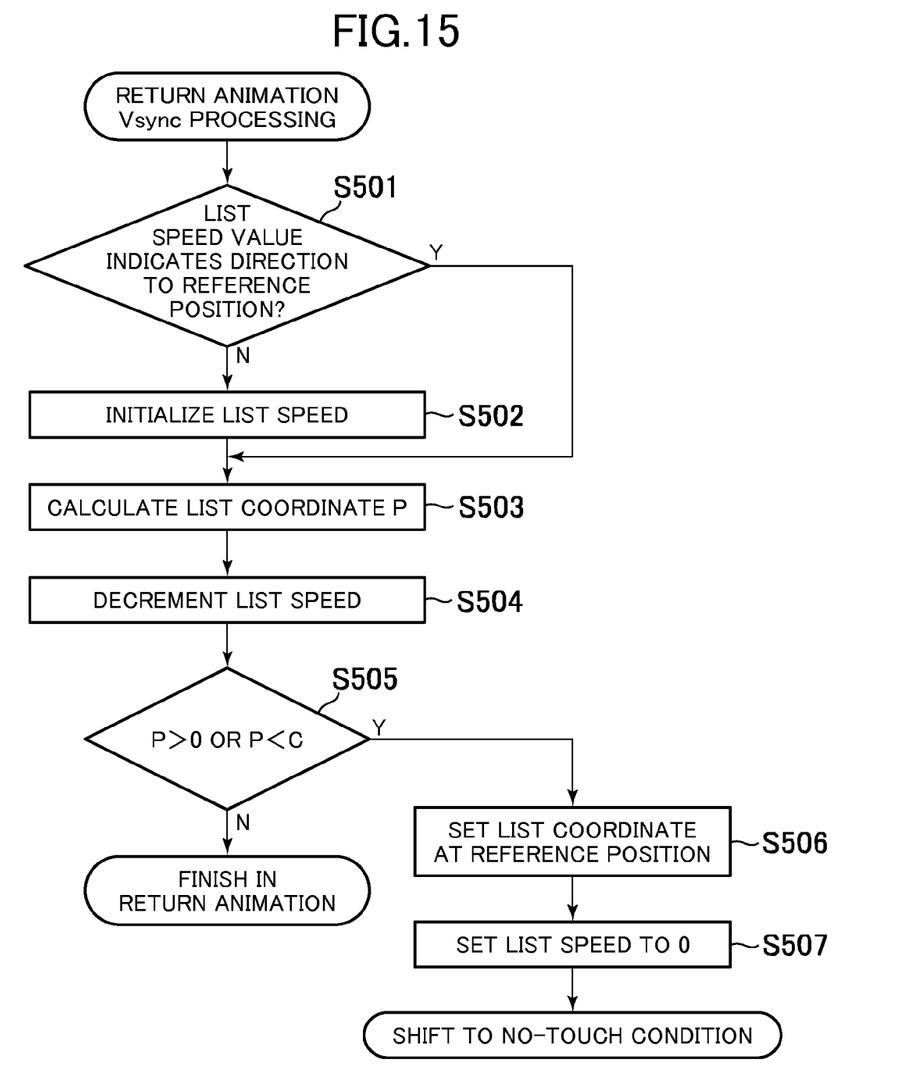
FIG. 15 is a flow chart illustrating information processing when a Vsync event occurs in a return animation condition.

FIG. 15 is a flow chart showing processing executed when the Vsync event occurs in the return animation condition. In this processing, it is determined whether or not the value of the movement velocity of the menu image indicates the value of menu item image 1 or 12 returning to each reference position (S501). More specifically, when the coordinate P is positive and the sign of the movement velocity V is negative, it is determined that the menu item image 1 moves toward the reference position (the position where the upper edge of the menu item image 1 is aligned with the upper edge of the screen). When the coordinate P is less than C and the sign of the movement velocity V is positive, it is determined that the menu item image 12 moves toward the reference position (the position where the lower edge of the menu item image 12 is aligned with the lower edge of the screen). If YES in S501, S502 will be skipped.

If NO in S501, the movement velocity V is set to the initial value (S502). More specifically, the movement velocity V is set to −V0 when the coordinate P is greater than 0, and the movement velocity V is set to +V0 when the coordinate P is less than C.

Subsequently, the movement velocity V is added to the previous coordinate P so as to calculate the current coordinate P, and thereby displaying the menu image on the touch panel 12 using the calculated coordinate P (S503). Further, a predetermined value is subtracted from the movement velocity V so as to bring the movement velocity V close to 0 (S504). In this regard, note that the sign of the movement velocity V should not be changed and the absolute value should not be less than the predetermined value.

Subsequently, it is determined whether or not the upper edge of the menu item image 1 is below the upper edge of the screen, or the lower edge of the menu item image 12 is above the lower edge of the screen (S505). More specifically, it is determined whether either of P>0 or P<C is true. If YES in S505, the processing is finished in the return animation condition. If NO in S505, the coordinate P is set to the reference position (S506). In other words, if the scrolling direction is upward, the coordinate P is set to 0, and if the scrolling direction is downward, the coordinate P is set to C. Then, the movement velocity V is initialized to 0 (S507), and the condition shifts to the no-touch condition.

According to the portable information processing device 10 mentioned above, the distance between the upper edge of the menu item image 1 and the upper edge of the screen is restricted to within the width W. Further, the distance between the lower edge of the menu item image 12 and the lower edge of the screen is also restricted to within the width W. When the distance exceeds the width W, the menu item image 1 and the menu item image 12 are returned to the respective reference positions by opposite direction scrolling. If the predetermined time has passed while the distance remains greater than 0 and less than W, the menu item image 1 and the menu item image 12 also return to the respective reference positions. In this way, it is possible not to increase the size of the background image 44. In addition, it is possible to restrain the background image 44 from being unnecessarily displayed on the touch panel 12.

The present invention is not to be limited to the above described embodiment. For example, the processing mentioned above is merely one example, and any other modified processing can be employed to implement the user interface according to the present invention.

What is claimed is:

1. An information processing device comprising:
   a display unit configured to display a portion of a display object, in which a plurality of element objects are arranged, in a display area, the plurality of display objects including a first end element object at a first end of the display object, and a second end element object at a second end of the display object, opposite to the first end of the display object, and the display area being bounded by a first edge and a second edge, opposite to the first edge;
   a first scrolling unit configured to scroll the display object in a first direction in response to an operation by a user, such that at least some of the plurality of element objects may be displayed within the display area, move in the first direction toward the second edge of the display area, and continue to move in the first direction outside of the display area beyond the second edge;
   a second scrolling unit configured to scroll the display object in a second direction in response to an operation by the user that is opposite to the first direction, such that at least some of the plurality of element objects may be displayed within the display area, move in the second direction toward the first edge of the display area, and continue to move in the second direction outside of the display area beyond the first edge; and
   a determination unit configured to determine to scroll the display object in the second direction, despite the operation of the user to scroll in the first direction, under each of the following conditions:
   (i) a portion of the first end element object, moving in the first direction, reaches a first predetermined distance away from the first edge of the display area; and
   (ii) the portion of the first end element object moving in the first direction and remaining less than the first predetermined distance away from the first edge of the display area for a first predetermined period of time.

2. The information processing device according to claim 1, wherein the determination unit determines whether or not to scroll the display object in the second direction based on a distance between a position placed in the display area and a position of the first element object.

3. The information processing device according to claim 1, wherein the determination unit determines whether or not to scroll the display object in the second direction based on a result of comparing a position placed in the display area with a position representing the plurality of element objects.

4. The information processing device according to claim 1, wherein the second scrolling unit, in response to the determination of the determination unit, scrolls the display object in the second direction, despite the operation of the user to scroll in the first direction, such that the portion of the first end element object is at a first reference position in the display area.

5. The information processing device according to claim 4, wherein the first reference position is substantially adjacent to the first edge of the display area.

6. The information processing device according to claim 1, wherein the determination unit is configured to determine to scroll the display object in the first direction, despite the operation of the user to scroll in the second direction, when at least one of:
   (i) a portion of the second end element object, moving in the second direction, reaches a second predetermined distance away from the second edge of the display area; and
   (ii) the portion of the second end element object, having moved in the second direction to a second resting position that is less than the second predetermined distance away from the second edge of the display area, remains at the second resting position for a second predetermined period of time.

7. The information processing device according to claim 6, wherein the first scrolling unit, in response to the determination of the determination unit, scrolls the display object in the first direction, despite the operation of the user to scroll in the second direction, such that the portion of the second end element object is at a second reference position in the display area.

8. A display control method comprising:
   displaying a portion of a display object, in which a plurality of element object are arranged, on a display area, the plurality of display objects including a first end element object at a first end of the display object, and a second end element object at a second end of the display object, opposite to the first end of the display object, and the display area being bounded by a first edge and a second edge, opposite to the first edge;
   scrolling the display object in a first direction in response to an operation by a user, such that at least some of the plurality of element objects may be displayed within the display area, move in the first direction toward the second edge of the display area, and continue to move in the first direction outside of the display area beyond the second edge;
   scrolling the display object in a second direction in response to an operation by the user that is opposite to the first direction, such that at least some of the plurality of element objects may be displayed within the display area, move in the second direction toward the first edge of the display area, and continue to move in the second direction outside of the display area beyond the first edge; and
   determining to scroll the display object in the second direction, despite the operation of the user to scroll in the first direction, under each of the following conditions:
   (i) a portion of the first end element object, moving in the first direction, reaches a first predetermined distance away from the first edge of the display area; and
   (ii) the portion of the first end element object moving in the first direction and remaining less than the first predetermined distance away from the first edge of the display area for a first predetermined period of time.

9. A non-transitory, computer readable storage medium containing a program for causing a computer to function as:
   a display unit configured to display a portion of a display object, in which a plurality of element objects are arranged, in a display area, the plurality of display objects including a first end element object at a first end of the display object, and a second end element object at a second end of the display object, opposite to the first end of the display object, and the display area being bounded by a first edge and a second edge, opposite to the first edge;

a first scrolling unit configured to scroll the display object in a first direction in response to an operation by a user, such that at least some of the plurality of element objects may be displayed within the display area, move in the first direction toward the second edge of the display area, and continue to move in the first direction outside of the display area beyond the second edge;

a second scrolling unit configured to scroll the display object in a second direction in response to an operation by the user that is opposite to the first direction, such that at least some of the plurality of element objects may be displayed within the display area, move in the second direction toward the first edge of the display area, and continue to move in the second direction outside of the display area beyond the first edge; and a determination unit configured to determine to scroll the display object in the second direction, despite the operation of the user to scroll in the first direction, under each of the following conditions:

(i) a portion of the first end element object, moving in the first direction, reaches a first predetermined distance away from the first edge of the display area; and (ii) the portion of the first end element object moving in the first direction and remaining less than the first predetermined distance away from the first edge of the display area for a first predetermined period of time.

10. The information processing device according to claim 7, wherein the second reference position is substantially adjacent to the second edge of the display area.

11. The method according to claim 8, wherein the step of scrolling the display object in the second direction, in response to the determination, scrolls the display object in the second direction, despite the operation of the user to scroll in the first direction, such that the portion of the first end element object is at a first reference position in the display area.

12. The method according to claim 11, wherein the first reference position is substantially adjacent to the first edge of the display area.

13. The method according to claim 8, further comprising determining to scroll the display object in the first direction, despite the operation of the user to scroll in the second direction, when at least one of:

(i) a portion of the second end element object, moving in the second direction, reaches a second predetermined distance away from the second edge of the display area; and (ii) the portion of the second end element object, having moved in the second direction to a second resting position that is less than the second predetermined distance away from the second edge of the display area, remains at the second resting position for a second predetermined period of time.

14. The method according to claim 13, wherein the step of scrolling the display object in the first direction, in response to the determination, scrolls the display object in the first direction, despite the operation of the user to scroll in the second direction, such that the portion of the second end element object is at a second reference position in the display area.

15. The method according to claim 14, wherein the second reference position is substantially adjacent to the second edge of the display area.

16. The non-transitory, computer readable storage medium containing the program according to claim 9, wherein the second scrolling unit, in response to the determination of the determination unit, scrolls the display object in the second direction, despite the operation of the user to scroll in the first direction, such that the portion of the first end element object is at a first reference position in the display area.

17. The non-transitory, computer readable storage medium containing the program according to claim 16, wherein the first reference position is substantially adjacent to the first edge of the display area.

18. The non-transitory, computer readable storage medium containing the program according to claim 9, wherein the determination unit is configured to determine to scroll the display object in the first direction, despite the operation of the user to scroll in the second direction, when at least one of:

(i) a portion of the second end element object, moving in the second direction, reaches a second predetermined distance away from the second edge of the display area; and (ii) the portion of the second end element object, having moved in the second direction to a second resting position that is less than the second predetermined distance away from the second edge of the display area, remains at the second resting position for a second predetermined period of time.

19. The non-transitory, computer readable storage medium containing the program according to claim 18, wherein the first scrolling unit, in response to the determination of the determination unit, scrolls the display object in the first direction, despite the operation of the user to scroll in the second direction, such that the portion of the second end element object is at a second reference position in the display area.

20. The information processing device according to claim 19, wherein the second reference position is substantially adjacent to the second edge of the display area.

* * * * *